(12) United States Patent
Malachowski et al.

(10) Patent No.: US 11,223,680 B2
(45) Date of Patent: Jan. 11, 2022

(54) COMPUTER SERVERS FOR DATACENTER MANAGEMENT

(71) Applicant: TELEFONAKTIEBOLAGET LM ERICSSON (PUBL), Stockholm (SE)

(72) Inventors: James Malachowski, San Francisco, CA (US); Nathan Rockhold, San Francisco, CA (US); Hwa Jin Bae, San Francisco, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 12 days.

(21) Appl. No.: 16/685,177

(22) Filed: Nov. 15, 2019

(65) Prior Publication Data

US 2020/0084275 A1   Mar. 12, 2020

Related U.S. Application Data

(63) Continuation of application No. 15/537,161, filed as application No. PCT/US2015/066153 on Dec. 16, 2015, now Pat. No. 10,516,734.

(Continued)

(51) Int. Cl.
*H04L 29/08* (2006.01)
*G06F 16/2455* (2019.01)
(Continued)

(52) U.S. Cl.
CPC ........ *H04L 67/1097* (2013.01); *G06F 16/182* (2019.01); *G06F 16/183* (2019.01); *G06F 16/24556* (2019.01); *G06F 16/258* (2019.01); *G06F 16/951* (2019.01); *H04L 67/10* (2013.01); *H04L 67/1002* (2013.01); *H04L 67/1095* (2013.01); *H04L 67/2838* (2013.01); *H04L 67/2895* (2013.01)

(58) Field of Classification Search
CPC . H04L 67/1097; H04L 67/10; H04L 67/2895; H04L 67/1002; H04L 67/1095; H04L 67/2838; G06F 16/182; G06F 16/183; G06F 16/258; G06F 16/951; G06F 16/24556

See application file for complete search history.

(56) References Cited

U.S. PATENT DOCUMENTS 6,829,610 B1 * 12/2004 Hickman ............ G06F 16/2471
7,167,912 B1 *  1/2007 Dhingra .............. H04L 43/0817
                                                        709/223

(Continued)

*Primary Examiner* — Jimmy H Tran

(57) ABSTRACT

A method for data management comprises receiving a request from a remote computer system of a datacenter to retrieve data stored across a plurality of computer servers in a distributed manner. The data can be with respect to a state and/or attribute of the remote computer system of the datacenter. The request can be received at a first computer server dedicated to the remote computer system among the plurality of computer servers. The first computer server can generate a query to retrieve the data and direct the query to one or more other computer servers of the plurality of computer servers to retrieve the data. The data can be aggregated at the first computer server from the one or more other computer servers and transmitted to the remote computer system from the first computer server dedicated to the remote computer system.

20 Claims, 2 Drawing Sheets

Related U.S. Application Data

(60) Provisional application No. 62/092,778, filed on Dec. 16, 2014.

(51) Int. Cl.
*G06F 16/182* (2019.01)
*G06F 16/25* (2019.01)
*G06F 16/951* (2019.01)

(56) References Cited

U.S. PATENT DOCUMENTS

| | | | | |
|---|---|---|---|---|
| 7,657,657 | B2* | 2/2010 | Rao | H04L 67/1034 709/248 |
| 7,685,109 | B1* | 3/2010 | Ransil | G06F 9/5083 707/999.003 |
| 8,051,156 | B1* | 11/2011 | Sharma | G06F 9/5094 709/223 |
| 9,128,899 | B1* | 9/2015 | McAlister | G06F 11/2023 |
| 9,268,590 | B2* | 2/2016 | Du | H04L 43/04 |
| 9,288,117 | B1* | 3/2016 | Angrish | H04L 43/00 |
| 10,241,712 | B1* | 3/2019 | Elliott, IV | G06F 3/067 |
| 10,264,058 | B1* | 4/2019 | Lauinger | G06F 9/45558 |
| 10,324,953 | B1* | 6/2019 | Elliott, IV | H04L 49/00 |
| 2002/0016827 | A1* | 2/2002 | McCabe | G06F 11/2069 709/213 |
| 2002/0042817 | A1* | 4/2002 | Lahr | H04L 67/2823 709/213 |
| 2004/0088331 | A1* | 5/2004 | Therrien | G06F 11/2038 |
| 2005/0097058 | A1* | 5/2005 | Hunt | H04L 41/0672 705/59 |
| 2005/0192971 | A1* | 9/2005 | Tabbara | H04L 69/329 |
| 2006/0218510 | A1* | 9/2006 | Ward | G06Q 10/06 715/853 |
| 2007/0156983 | A1* | 7/2007 | Kern | G06F 11/2064 711/162 |
| 2007/0180309 | A1* | 8/2007 | Zohar | G06F 11/2058 714/6.12 |
| 2008/0052313 | A1* | 2/2008 | Keen | G16H 30/20 |
| 2008/0126842 | A1* | 5/2008 | Jacobson | G06F 11/1662 714/6.12 |
| 2009/0070697 | A1* | 3/2009 | Forest | H04L 41/22 715/772 |
| 2009/0216969 | A1* | 8/2009 | Winokur | G06F 11/2082 711/162 |
| 2010/0228819 | A1* | 9/2010 | Wei | H04L 67/1095 709/203 |
| 2011/0305149 | A1* | 12/2011 | Scott | H04L 43/106 370/252 |
| 2012/0079224 | A1* | 3/2012 | Clayton | G06F 11/1448 711/162 |
| 2012/0096169 | A1* | 4/2012 | Oeda | G06F 9/4856 709/226 |
| 2013/0173539 | A1* | 7/2013 | Gilder | G06F 16/27 707/622 |
| 2013/0185243 | A1* | 7/2013 | Lorge | G06N 5/025 706/47 |
| 2013/0191523 | A1* | 7/2013 | Buck | G06F 9/5066 709/223 |
| 2013/0263131 | A1* | 10/2013 | Beda, III | G06F 9/5011 718/1 |
| 2013/0268799 | A1* | 10/2013 | Mestery | H04L 49/555 714/4.2 |
| 2013/0318129 | A1* | 11/2013 | Vingralek | G06F 16/211 707/803 |
| 2013/0346576 | A1* | 12/2013 | Huang | H04L 45/745 709/223 |
| 2014/0040343 | A1* | 2/2014 | Nickolov | H04L 67/1029 709/201 |
| 2014/0052864 | A1* | 2/2014 | Linden | H04L 47/70 709/226 |
| 2014/0149794 | A1* | 5/2014 | Shetty | G06F 16/183 714/20 |
| 2014/0181040 | A1* | 6/2014 | Montulli | G06F 11/2094 707/652 |
| 2014/0280810 | A1* | 9/2014 | Gabrielson | H04L 12/6418 709/222 |
| 2014/0302877 | A1* | 10/2014 | Johnson | H04L 43/16 455/456.3 |
| 2015/0161209 | A1* | 6/2015 | Uppala | G06F 16/24532 707/697 |
| 2015/0186176 | A1* | 7/2015 | Kodi | G06F 9/45558 718/1 |
| 2015/0301899 | A1* | 10/2015 | Montulli | G06F 11/1469 714/19 |
| 2015/0309890 | A1* | 10/2015 | Pershin | H04L 67/1095 714/4.11 |
| 2016/0034319 | A1* | 2/2016 | Gladkikh | H04L 67/141 709/228 |
| 2016/0077919 | A1* | 3/2016 | Duggan | G06F 11/1446 714/15 |
| 2016/0132411 | A1* | 5/2016 | Jolad | G06F 11/2046 714/6.3 |
| 2016/0162372 | A1* | 6/2016 | Whitehead | G06F 11/1402 707/654 |
| 2016/0328463 | A1* | 11/2016 | Adoc, Jr. | H04L 67/1095 |
| 2017/0011090 | A1* | 1/2017 | Chen | G06F 16/182 |

\* cited by examiner

COMPUTER SERVERS FOR DATACENTER MANAGEMENT

CROSS-REFERENCE

This application is a continuation of U.S. application Ser. No. 15/537,161 filed 16 Jun. 2017, which was the National Stage of International Application PCT/US2015/066153 filed 16 Dec. 2015, which claims the benefit of U.S. Provisional Application No. 62/092,778, filed 16 Dec. 2014, the disclosures of all of which are incorporated herein by reference in their entirety.

BACKGROUND

A data center is a facility that may be used to house computer systems and associated components, such as telecommunications and storage systems. A data center may include redundant or backup power supplies, redundant data communications connections, environmental controls (e.g., air conditioning and fire suppression) and various security devices.

The organization of large scale data centers has evolved rapidly as the commercial opportunities they provide has expanded. Typical modern data centers may be organized collections of clusters of hardware that run collections of standard software packages, such as web servers database servers, etc., which may be interconnected by high speed networking, routers, and firewalls. Human operators typically organize these machines, optimize their configuration, debug errors in their configuration, and install and uninstall software on the constituent machines.

There are web services (e.g., software as a service, or "SaaS") that are supported by data centers. Many services are designed as "distributed" applications characterized by components that run on different machines, typically in communication via a network, such as the Internet. For example, a shift towards interactive Web 2.0 applications has led to development of truly distributed systems where code is written in different languages, runs on multiple machines, and interacts in complex ways. Today, many such applications are written in an ad-hoc manner, where the server and client-side functionality are developed at the same time—but separately and often in different programming languages—and subsequently combined. Distribution of multi-tier components can be complex and require significant resources to ensure proper operation, not to mention collection of information as to how an application performs, the number of users and other metrics that can impact overall cost (e.g., number of servers, bandwidth, number of I/Os, advertising revenue, etc.).

SUMMARY

The present disclosure provides computer systems for monitoring data centers. Computer systems of the present disclosure can include computers that store storing information that is relevant to a datacenter, including an attribute and/or a state of each computer server of the datacenter.

Systems of the present disclosure provide a platform for automated systems management and analytics. Such systems can be a readily scalable approach to deploy, monitor and operate data center infrastructures.

Systems provided herein can be fully integrated deployment and operations platforms. They can take racks of servers from the factory and can automate and configure bare-metal configuration settings (BIOS, BMC, RAID, peripherals, etc.) as well as firmware packages to optimize a data center. Systems provided herein can provide insight into power consumption, temperature and environmental data, in addition to standard monitoring components of data centers, such as components of computer servers (e.g., computer processors, memory, hard disks and network traffic).

Computer systems of the present disclosure can provide users (e.g., systems administrators) the ability to monitor data centers having a variety of computer servers, and to take action with respect to an attribute or state change of those computer servers. This enables the users to take action in little to no time, substantially improving the manner in which data centers are monitored and maintained. Computer systems provided herein can minimize, if not eliminate, downtime that may be associated with loss in data center performance, including computer server failure.

Computer systems of the present disclosure can provide various advantages and benefits, such as enabling users to monitor and manage data centers with a plurality of devices (e.g., computer servers) from a single location, and take any action that may be necessary to maintain the devices. In some situations, a user can receive a notification of a request for an action and take action in a time period that is less than about 30 minutes, 20 minutes, 10 minutes, 5 minutes, 1 minute, 30 seconds or 10 seconds. As an alternative, the user can request that action be taken automatically if one or more conditions defined by the user have been satisfied.

In an aspect, the present disclosure provides a computer-implemented method for data management, comprising (a) providing a computer system including a plurality of computer servers that are operatively coupled to one another over a first network, wherein each of the plurality of computer servers is programmed to store data with respect to an attribute and/or state of a remote computer system, wherein the plurality of computer servers includes a first computer server that is operatively coupled to the remote computer system over a second network, which first computer server is dedicated to the remote computer system for access and/or retrieval of the data; (b) receiving, at the first computer server over a second network, a request from the remote computer system to retrieve at least a subset of the data; (c) directing over the first network a query from the first computer server to one or more other computer servers of the plurality of computer servers to retrieve the at least the subset of the data; (d) aggregating at least a portion of the at least the subset of the data at the first computer server from the one or more other computer servers over the first network; and (e) directing the at least the subset of the data from the first computer server to the remote computer system over the second network.

In some embodiments, the data is stored in a distributed fashion on at least a subset of the plurality of computer servers. In some embodiments, the data is stored with a timestamp that corresponds to the date and time point(s) in which the data was stored in the plurality of computer servers. In some embodiments, (d) comprises sorting the at least the subset of the data by the timestamp. In some embodiments, the data is stored with information that identifies which of the plurality of computer servers stored the data or subset thereof. In some embodiments, the one or more other computer servers include a second computer server that is operatively coupled to the first computer server over the first network, which second computer server mirrors the first computer server. In some embodiments, (d) comprises transforming the at least the subset of the data collected from the first computer server and/or the one or more other computer servers into a format that is presentable to the remote computer system. In some embodiments, (d) comprises aggregating a remainder of the at least the subset of the data from the first computer server.

In another aspect, the present disclosure provides a system for data management, comprising a computer system having a plurality of computer servers that are operatively coupled to one another over a first network, wherein each of the plurality of computer servers is programmed to store data with respect to an attribute and/or state of a remote computer system, wherein the plurality of computer servers includes a first computer server that is operatively coupled to the remote computer system over a second network, which first computer server is dedicated to the remote computer system for access and/or retrieval of the data; a communication interface that is adapted to bring the first computer server in communication with the remote computer server over the second network; and a computer processor that is programmed to (i) receive a request from the remote computer system via the communication interface over the second network to retrieve at least a subset of the data; (ii) direct over the first network a query to the one or more other computer servers of the plurality of computer servers to retrieve the subset of the data; (iii) aggregate at least a portion of the subset of the data at the first computer server from the one or more other computer servers over the first network; and (iv) direct the subset of the data from the first computer server to the remote computer system over the second network.

In some embodiments, the data is stored in a distributed fashion on at least a subset of the plurality of computer servers. In some embodiments, the data is stored with a timestamp that corresponds to the date and time point(s) in which the data was stored in the plurality of computer servers. In some embodiments, the computer processor is programmed to sort the at least the subset of the data by the timestamp. In some embodiments, the data is stored with information that identifies which of the plurality of computer servers stored the data or subset thereof. In some embodiments, the one or more other computer servers include a second computer server that is operatively coupled to the first computer server over the first network, which second computer server mirrors the first computer server. In some embodiments, the computer processor is programed to transform the at least the subset of the data collected from the first computer server and/or the one or more other computer servers into a format that is presentable to the remote computer system. In some embodiments, the computer processor is programmed to aggregate a remainder of the at least the subset of the data from the first computer server. In some embodiments, Another aspect of the present disclosure provides a non-transitory computer-readable medium comprising machine-executable code that upon execution by one or more computer processors implements any of the methods above or elsewhere herein.

In some embodiments, a computer-readable medium comprises machine-executable code that, upon execution by one or more computer processors, implements a method for data management, the method comprising providing a computer system including a plurality of computer servers that are operatively coupled to one another over a first network, wherein each of the plurality of computer servers is programmed to store data with respect to an attribute and/or state of a remote computer system, wherein the plurality of computer servers includes a first computer server that is operatively coupled to the remote computer system over a second network, which first computer server is dedicated to the remote computer system for access and/or retrieval of the data; receiving, at the first computer server over a second network, a request from the remote computer system to retrieve at least a subset of the data; directing over the first network a query from the first computer server to one or more other computer servers of the plurality of computer servers to retrieve the at least the subset of the data; aggregating at least a portion of the at least the subset of the data at the first computer server from the one or more other computer servers over the first network; and directing the at least the subset of the data from the first computer server to the remote computer system over the second network.

In some embodiments, the data is stored in a distributed fashion on at least a subset of the plurality of computer servers. In some embodiments, (d) comprises transforming the at least the subset of the data collected from the first computer server and/or the one or more other computer servers into a format that is presentable to the remote computer system. In some embodiments, (d) comprises aggregating a remainder of the at least the subset of the data from the first computer server.

Another aspect of the present disclosure provides a system comprising one or more computer processors and memory coupled thereto. The memory comprises machine-executable code that upon execution by the one or more computer processors implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "figure" and "FIG." herein), of which:

DETAILED DESCRIPTION

Figure 1:
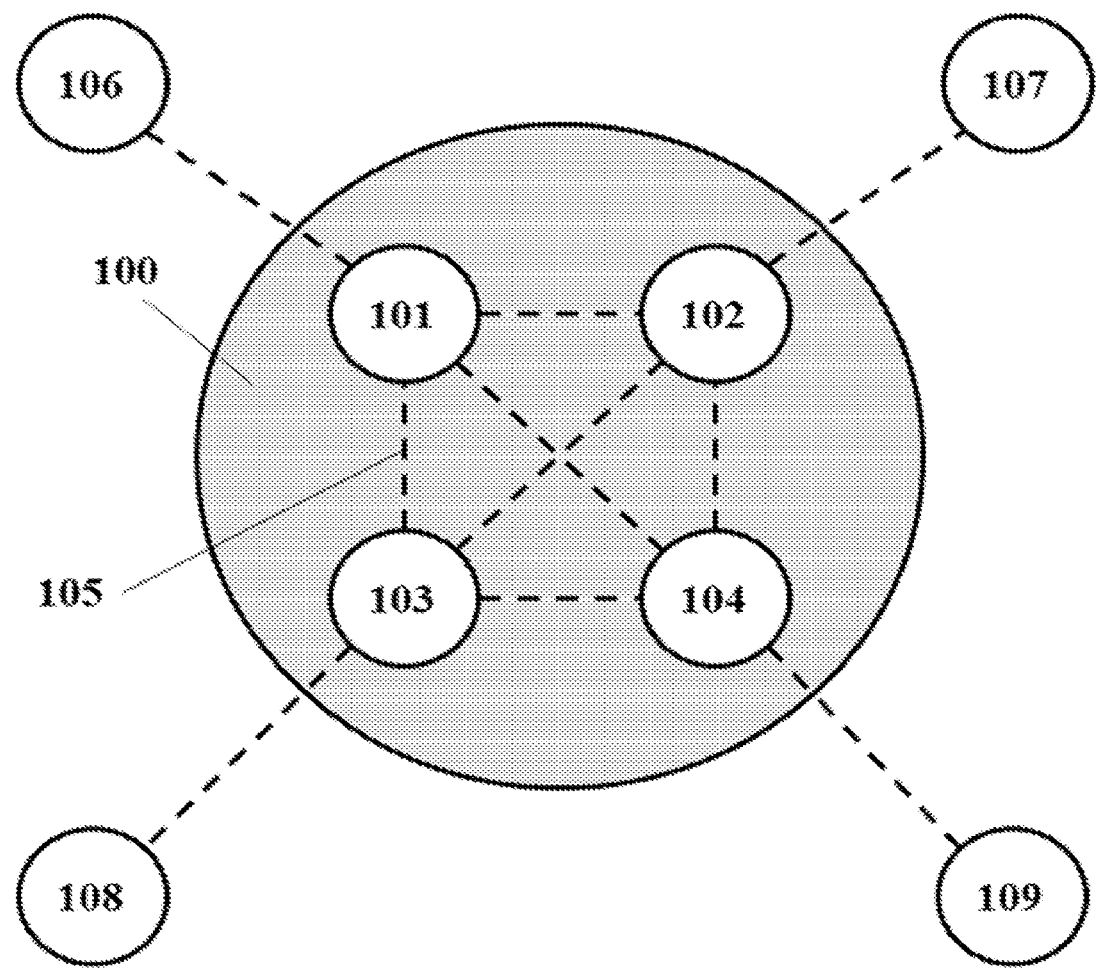
FIG. 1 shows a computer system for data management.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "attribute," as used herein, generally refers to a property of software products, computer systems or computer servers, or processes.

The term "metric," as used herein, generally refers to a quantitative attribute.

The term "state," as used herein, generally refers to a condition of a computer system or computer server. The state of a computer system can include various operational parameters of the computer system, including power consumption, temperature and environmental data (e.g., pressure, temperature and humidity).

The term "node," as used herein, generally refers to a device being monitored or managed, such as a computer server, or any connected device.

Computer Systems and Methods for Data Management

The present disclosure provides computer systems for data management, including data storage, access and retrieval. Such computer systems can be employed for storing data, which can be used for various settings. In some examples, computer systems of the present disclosure can be used to monitor and manage datacenters, each of which can include one or more computer servers.

A computer system for data storage and/or management can include a plurality of computer servers that are operatively coupled to one another over a first network. Each of the plurality of computer servers can be programmed to store data, such as data is with respect to an attribute and/or state of a remote computer system. A computer server can store other data, such as, for example, financial data, health data, media data (e.g., images, audio and/or video), and/or textual data (e.g., documents). The plurality of computer servers can include a first computer server that is operatively coupled to the remote computer system over a second network. The first computer server can be dedicated to the remote computer system for access and/or retrieval of the data. That is, when the remote computer system wishes to access the data, the remote computer system contacts the first computer server.

The remote computer system can contact the first computer server directly or through one or more other computers, such as one or more other computer servers. The remote computer server can contact the first computer server over a network. The remote computer server can contact the first computer server through a wired connection or wireless connection, each of which may be over a network.

In a method for data management, a request from the remote computer system to retrieve at least a subset of the data is received at the first computer server over a second network. The second network can be different than the first network. For example, the first network can be an intranet or other local network, and the second network can be the Internet. The request can be by way of a query that is generated at the remote computer system.

Next, the first computer server can generate a query and direct the query over the first network to one or more other computer servers of the plurality of computer servers. The query can be directed to retrieving the at least the subset of the data.

Next, the at least the subset of the data can be aggregated at the first computer server from the first computer server and/or the one or more other computer servers over the first network. In some cases, the at least the subset of the data is aggregated from the one or more other computer servers. The at least the subset of the data can be aggregated in view of the query.

Next, the at least the subset of the data can be directed from the first computer server to the remote computer system over the second network. In such manner, the first computer server can assume the responsibility of querying the other computer servers to collect data that meets the query and direct the data to the remote computer system.

The data can be stored in a distributed fashion on at least a subset of the plurality of computer servers. At least about 0.1%, 1%, 10%, 20%, 30%, 40%, 50%, 60%, 70%, 80%, or 90% of the data can be stored on the first computer server, and at least a portion or all of the remainder can be stored on one or more other computer servers. The one or more other computer servers can include at least 1, 2, 3, 4, 5, 6, 7, 8, 9, 10, 20, 30, 40, 50, 100, 200, 300, 400, 500, or 1000 computer servers. Data may be stored on one or more computer servers via data replication. For example, 10% of the data can be stored (or replicated) on the first computer server and 90% of the data can be stored on the one or more other computer servers. However, by querying the plurality of computer servers, all of the data meeting the query can be aggregated at a single location regardless of the location at which it is stored. This can enable for an efficient manner to store and access data across multiple computer servers.

In some examples, a variety of different methods may be used to determine data storage (or replication). The distribution of data may be user/developer configurable based on a particular use case. In some examples, clients may only send one copy of a particular data (e.g., message) to a given server. The servers, in turn, may replicate the one copy to other servers.

In cases where queries are done on primary copies of data, the replicas may be intended only for disaster recovery. In such cases, replication may be done periodically between servers in bulk. In particular, in some examples, replication may be done on a bulk-level rather than a per-message or per-data unit level. For example, if a client sends a syslog message, each individual syslog may be synchronized to a primary server's storage in real-time. However, the replication of the messages may be done asynchronously in batches of larger chunks (e.g., groups of messages).

In some examples, server side replication partner selection may be automatic, but may not use consistent hashing like clients selecting servers. Instead, a modulo-based formula may be used per cluster set. In some examples, a set is a group of nodes. In some cases, a minimum size of a cluster set is two. In some examples, when adding new nodes, at least two nodes may be added at a time. When at least two nodes are added at a time, replication can proceed without disruption. Additionally, there may also be a replication specification that the users can set to configure various options to replicate (e.g., interval, push/pull, etc.).

In some examples, replication may have several parameters that can be set using a rep-spec command line flag or the HTTP API (/api/v1/setRepSpec). In some examples, the string is composed of one or more comma-separated parameters, assuming the default values if missing. In some examples, the parameters may be: mode=pull, which pulls the data from the remote end; mode=push, which requests a push to ourself from the remote end; mode=pull-once, which requests a pull to ourself from the remote end only once until the next rep-spec is called; mode=push-once, which requests a push to ourself from the remote end only once until the next rep-spec is called; mode=disable, which is not starting the replication until the next rep-spec is called; interval=X, which starts the replication process every X seconds, X may be positive; addr=auto, which finds a replication peer automatically using discovery and the modulo based formula; addr=IP:PORT, which sets the replication peer to the given IP:PORT address; target=replica, in which all the data gets replicated to the replica directory; and/or target=primary, in which the primary data gets replicated to the primary directory, the directories bolt and tv go to the replica directory.

In some examples, the following sequence of events will occur: (1) A goes down, A comes up: B will buffer data until A comes up, then it will forward the buffered data to A, A will pull from B to ensure that no data got lost; (2) B goes down, B comes up: B will push to A, repairing any data that may have be lost; (3) A goes down, B goes down, A comes up, B comes up: B will replicate its primary data by pushing to A and then keep forwarding; and (4) A goes down, B goes down, B comes up, A comes up: B will buffer data until A comes up, then it will forward the buffered data to A, A will pull from B to ensure that no data got lost.

In some cases, the data can be stored with a timestamp that corresponds to the date and time point(s) in which the data was stored in the plurality of computer servers. The timestamp can include other information that may be relevant to the data, such as information that identifies which of the plurality of computer servers stored the data or subset thereof.

In some cases, upon aggregating at least the subset of the data, the subset can be sorted by various parameters. For example, the at least the subset of the data can be sorted by timestamp (e.g., newest to oldest, or vice versa).

A given data can be stored with information that identifies which of the plurality of computer servers stored the given data or subset thereof. For example, if the first computer server stored the given data, then the given data can be stored with identifying information of the first computer server, such as a unique identifier (e.g., media access control (MAC) address).

The one or more other computer servers can include a second computer server that is operatively coupled to the first computer server over the first network. The second computer server can mirror the first computer server. In some cases, the second computer server includes a data storage unit that is at least a partial or full replica of a data storage unit of the first computer server. This can enable the second computer server to take the place of the first computer server in case the first computer server experiences a crash or other failure. The second computer server can then be dedicated to the remote computer system for access and/or retrieval of the data.

In some situations, upon aggregating the at least the subset of the data, the at least the subset is transformed. For example, the at least the subset of the data collected from the first computer server and/or the one or more other computer servers can be transformed into a format that is presentable to the remote computer system.

The remote computer system can be a remote datacenter, which can include one or more remote computer servers. Each computer server can store information that is relevant to the remote datacenter. The information can include an attribute and/or state of each of the one or more remote computer servers. The computer system can include a computer processor that is programmed to monitor the attribute of each of the one or more remote computer servers and receive periodic updates with respect to the attribute and/or state. The computer processor can be a central processing unit (CPU). The computer processor can also be programed to direct the periodic updates to the datacenter. The period updates can be directed asynchronously.

An update may be indicative of a change in an attribute, a state or both the attribute and the state of a computer server. For example, the update may indicate that the computer server, which was operating under normal conditions, now has an attribute or state that is indicative of a malfunction (e.g., faulty hard drive or high processor temperature). As an alternative or in addition to, the update may be indicative of no change in an attribute, a state or the attribute and the state of the computer server. For example, the update may indicate that the computer server is still operating under normal conditions.

A data center can be located in a different city of state than the computer system. The data center can be located at a distance that is at least about 0.1 miles, 1 mile, 2 miles, 3 miles, 4 miles, 5 miles, or 10 miles from the computer system.

A state of a remote computer server can be selected from memory utilization, computer processor utilization, disk utilization, active/inactive, process information and/or sensor information. An attribute of the remote computer server can be selected from computer processor, operating system, hard disk platform, vendor, media access control (MAC) address and/or physical components.

At least some or a majority of the remote computer servers can be manufactured by different vendors, such as different companies (e.g., Dell® and Lenovo®). The computers servers can have different device attributes, such as different computer processors and/or memory.

The computer system can provide notifications to the user. An example of a notification can be a reminder, such as a reminder for software upgrade (e.g., firmware upgrade). Another example of a notification is an alert, such as an alert that a computer server is not functioning or requires maintenance.

The computer system can enable the user to instruct each remote computer server of the datacenter to perform an action. The action can be, for example, to turn a remote computer sever on or off, to perform an update (e.g., software update), or to take the computer server offline.

The computer system can provide the user with metrics that are relevant to at least a subset of the one or more remote computer servers of the datacenter. A metric can be a performance metric, such as resource utilization of a remote computer server or multiple remote computer servers. In some examples, metrics include computer processor utilization, memory utilization, disk space utilization, processes being run, and/or sensor utilization. The computer system can be programmed to enable various user-implemented actions (e.g., update firmware, activate, inactivate, or burn in) with respect to each remote computer server of the datacenter.

In some cases, as data is saved on a computer server, a message digest of the data is generated. The message digest can be a cryptographic hash function containing a string of digits created by a one-way hashing formula.

The first computer server can include a log file showing the data or subset thereof and other identifying information, such as a timestamp of each of the data or subset thereof and identifying information with respect the computer server(s) on which the data or subset thereof is stored. The log file can be updated periodically (e.g., every 1 second, 10 seconds, 60 seconds, or 10 minutes), or upon the occurrence of a trigger event, such as when the first computer server is accessed or a system level event.

Systems provided herein can be fully integrated deployment and operations platforms. They can take racks of servers from the factory and can automate and configure bare-metal configuration settings (BIOS, BMC, RAID, peripherals, etc.) as well as firmware packages to optimize a data center. Systems provided herein can provide insight into power consumption, temperature and environmental data, in addition to standard monitoring components of data centers, such as components of computer servers (e.g., computer processors, memory, hard disks and network traffic).

FIG. 1 shows a computer system 100 for data management. The system 100 can enable the storage, access and/or retrieval of data stored by remote computer systems on the system 100. The remote computer system can be datacenters each having one or more remote computer servers.

The computer system 100 includes a plurality of computer servers, including a first computer server 101, second computer server 102, third computer server 103 and fourth computer server 104. The computer system 100 can include any number of computer servers, in some cases at least 2, 3, 4, 5, 6, 7, 8, 9, 10, 20, 30, 40, 50, 100, 200, 300, 400, 500, 1000 or more computer servers. The computer servers 101-104 are in communication with one another over a network that is internal to the computer system 100, as shown by dashed lines.

Each of the computer servers 101, 102, 103 and 104 may be a node. Each of the nodes may be monitored. For example, a state and/or attribute of a node may be monitored.

A user may monitor multiple nodes and take a given action or a plurality of actions with respect to at least a subset of the nodes. The action can be defined by the user or a default action, such as a default action implemented by a computer system of the user. The computer system of the user can include a user interface that enables the user to interact with a node or view a state and/or attribute of the node. Examples of user interfaces that may be usable by methods and systems of the present disclosure are provided in PCT/US15/44721 ("SYSTEMS FOR MANAGING DATACENTERS"), which is entirely incorporated herein by reference.

With continued reference to FIG. 1, a first remote computer system 106, second remote computer system 107, third remote computer system 108 and fourth remote computer system 109 are in communication with the system 100 over a network (e.g., Internet). At least some of the remote computer systems 106-109 can be datacenters, each having one or more remote computer servers. As an alternative, at least some of the remote computer systems 106-109 can be computers systems that manage datacenters (e.g., computers systems of systems administrators). Data stored by the computer system 100 can be with respect to a state and/or attribute of a given remote computer system 106, 107, 108 or 109, including one or more remote computer servers of the given remote computer system 106, 107, 108 or 109.

In an example, the first remote computer system 106 is a data center that includes a plurality of remote computer servers that enable users to store data. The computer system 100 access the remote computer system 106 to monitor a state of the remote computer system 106. The remote computer system 106 can send the computer system 100 periodic (e.g., every 1 second, 10 seconds, 60 seconds, or 10 minutes) updates of information with respect to a state and/or attribute of the computer system 106. Such information can be stored by the computer system 100 in a distributed fashion. In some cases, the information is stored with identifying details as to the source of the information (e.g., remote computer system), details as to the system on which the information is stored, and a timestamp that indicates when the information was stored.

For instance, the first computer server 101 can be dedicated for direct communication with the first remote computer system 106. In some cases, the first remote computer system 106 communicates with the first computer server 101 and no other computer server in the computer system 100. The first remote computer system 106 may not know the identity of the first computer server 101, but the computer system 100 can dedicate the first computer server 101 for use with the first remote computer system. When the first remote computer system 106 wishes to access such information or subset thereof, the first remote computer system 106 directs a query over a network to the first computer server 101, which then collects the information or subset thereof from itself and the other computer servers 102-104. Once the first computer server 101 has aggregated the information, the first computer server can direct such information to the first remote computer system 106. For example, the first computer server 101 can aggregate information with respect to an attribute and/or state of the first remote computer system 106, including metrics in some cases, and direct such information to the first remote computer system 106.

System 100 may be used as a virtual datacenter. In some examples, a virtual datacenter as discussed herein may be considered an industry first application to allow the users to build out a simulated datacenter in an instant on a laptop that constructs many various hardware server configurations with an overlaying virtual network. Once the topology and servers are constructed, then the users can load and test any applications without any additional hardware. Key benefits may include: simulating topology and server configuration; accelerating testing of applications; and accelerating testing of hardware provision, deployment setup.

In an example of an accelerating deployment phase, the system 100 may be used for discovery and provisioning; BMC IPMI/system controls; network and PXE services; and OS and post-OS deployment and services. In an example of an optimizing runtime environment, the system 100 may be used for constructing and testing environment and topology; scale out application deployments; application staging and data migrations; and analytics and predications.

In some examples, system 100 may be used to deliver an advanced inventory and analytic platform for heterogeneous, multi-vendor, multi-generational of IT infrastructure, networks and any x86/ARM servers. Additionally, system 100 may enable IT managers, operators to quickly discover datacenter assets, aggregate the inventory data and present them on a single dashboard to provide quick search, filter to operate datacenter more intelligently. In addition, system 100 may also collect metrics, syslog to help the operator to perform preventative analysis.

In some examples, system 100 may boost datacenter performance by: (1) Reducing CapEx: Through discovery of under-performed, under-utilized servers to increase the utilization; (2) Reducing OpEx: Through deep inventory analysis of components and OS packages to improve efficiency of the overall systems; (3) Reducing unplanned outages: Cross-correlation machine learnings at component level to drive failure prediction and recommendation. Additionally, main features may include (1) Quick, simple stand-alone deployment—up running in minutes; (2) Advanced operational dashboard with native apps to analyze various aspects of the data center; (3) High data ingested performance datastore; (4) Time stamped of all inventory, sys-logs and metrics data;

(5) Comprehensive intelligence on performance, state and reliability; (6) Root cause identification through machine learning; (7) Detailed forensic analysis to drive compliance and SLA's; (8) Fully customizable subscriptions and alerts; and (4) Full API support.

Additionally, system 100 may also be used as an integrated solution designed to provide a full life cycle management and automation for hyper-scale datacenter. It enables IT managers, operators to efficiently deploy, provision bare metals from dock to OS ready across heterogeneous hardware. In addition, it performs many of the today and tomorrow operations in automated fashions at large scale.

Key benefits may include (1) Reducing OpEx: Improve the data center operational efficiency through automation with most of the common and complex work flows; and (2) Reducing CapEx: Root cause and corrective actions with data driven from the analytics. Additionally, main features may include (1) Simple to deploy with no complex external dependancies; (2) Full PXE support (DHCP, DNS, TFTP); (3) Serves OS images or any other supported files based on selected profiles; (4) Configure boot rule and any other CFI (RAID, network bonding etc); (5) Full IPMI command supported; (6) Perform network level in-band or out-of-band commands to all the servers; (7) Support multiple protocols (SNMP, IPMI, LLDP and vendor CLI); and (8) Full API support.

In some examples, system 100 is a hyperscale datacenter management platform that provides multi-vendor hardware control, high-speed scalable timeseries data collection and powerful interfaces for datacenter operators and developers. Designed to manage environments ranging from the smallest test lab to a hundred-thousand node datacenter, the platform of system 100 may center around flexible data models constructed on the fly for any data type—metrics, logs, blob data and key-value store. Components written in technology of system 100 may be used to discover inventory, alert on system log events and track performance metrics and hardware changes over time. In some examples, data may be written as fast as it is delivered in a format that easily integrates with other databases, languages and tools.

The computer system 100 can be used to store various types of data, including information with respect to a state and/or attribute of a remote computer system. Such data includes, without limitation, usage data and data files. Data files can include media files, including music files, video files, image files, text files, program (or software) files, or any other file that is suitable to store information. Such data files can also include files with metadata.

Computer Systems

Figure 2:
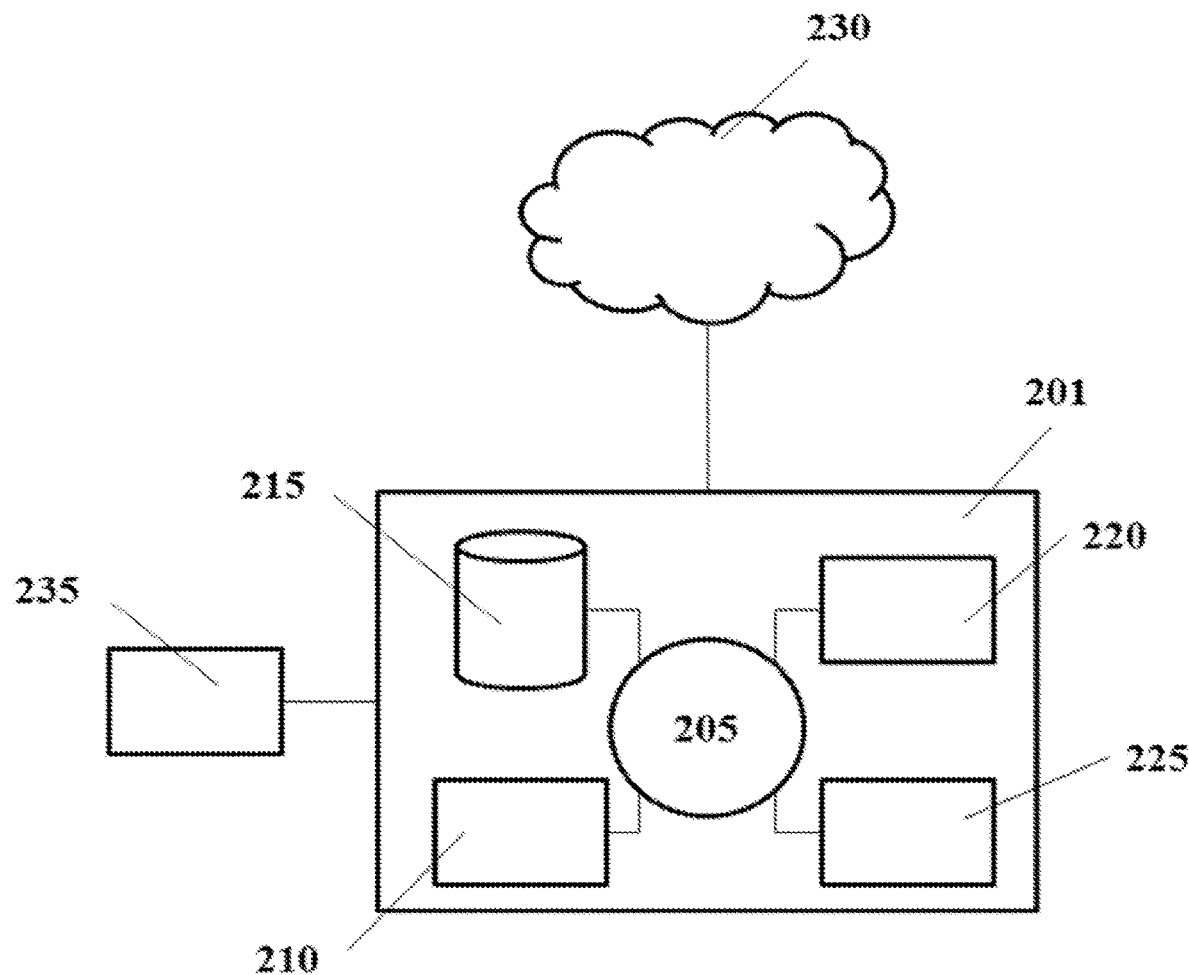
FIG. 2 schematically illustrates a computer system that is programmed or otherwise configured to implement user interfaces of the present disclosure.

The present disclosure provides computer systems that are programmed or otherwise configured to implement systems of the present disclosure. FIG. 2 shows a computer system 201 that is programmed or otherwise configured to for data management. For instance, the computer system 201 can be any one of the computer servers 101-104 of FIG. 1.

The computer system 201 can regulate various aspects of data center monitoring of the present disclosure, such as, for example, monitoring computer servers and present a state and/or attribute of the computer servers to a user on a user interface displayed on an electronic display of an electronic device of the user.

The computer system 201 includes a central processing unit (CPU, also "processor" and "computer processor" herein) 205, which can be a single core or multi core processor, or a plurality of processors for parallel processing. The computer system 201 also includes memory or memory location 210 (e.g., random-access memory, read-only memory, flash memory), electronic storage unit 215 (e.g., hard disk), communication interface 220 (e.g., network adapter) for communicating with one or more other systems, and peripheral devices 225, such as cache, other memory, data storage and/or electronic display adapters. The memory 210, storage unit 215, interface 220 and peripheral devices 225 are in communication with the CPU 205 through a communication bus (solid lines), such as a motherboard. The storage unit 215 can be a data storage unit (or data repository) for storing data. The computer system 201 can be operatively coupled to a computer network ("network") 230 with the aid of the communication interface 220. The network 230 can be the Internet, an internet and/or extranet, or an intranet and/or extranet that is in communication with the Internet. The network 230 in some cases is a telecommunication and/or data network. The network 230 can include one or more computer servers, which can enable distributed computing, such as cloud computing. The network 230, in some cases with the aid of the computer system 201, can implement a peer-to-peer network, which may enable devices coupled to the computer system 201 to behave as a client or a server.

The CPU 205 can execute a sequence of machine-readable instructions, which can be embodied in a program or software. The instructions may be stored in a memory location, such as the memory 210. The instructions can be directed to the CPU 205, which can subsequently program or otherwise configure the CPU 205 to implement methods of the present disclosure. Examples of operations performed by the CPU 205 can include fetch, decode, execute, and writeback.

The CPU 205 can be part of a circuit, such as an integrated circuit. One or more other components of the system 201 can be included in the circuit. In some cases, the circuit is an application specific integrated circuit (ASIC).

The storage unit 215 can store files, such as drivers, libraries and saved programs. The storage unit 215 can store user data, e.g., user preferences and user programs. The computer system 201 in some cases can include one or more additional data storage units that are external to the computer system 201, such as located on a remote server that is in communication with the computer system 201 through an intranet or the Internet.

The computer system 201 can communicate with one or more remote computer systems through the network 230. For instance, the computer system 201 can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 201 via the network 230.

Methods as described herein can be implemented by way of machine (e.g., computer processor) executable code stored on an electronic storage location of the computer system 201, such as, for example, on the memory 210 or electronic storage unit 215. The machine executable or machine readable code can be provided in the form of software. During use, the code can be executed by the processor 205. In some cases, the code can be retrieved from the storage unit 215 and stored on the memory 210 for ready access by the processor 205. In some situations, the electronic storage unit 215 can be precluded, and machine-executable instructions are stored on memory 210.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 201 can include or be in communication with an electronic display 235 that comprises a user interface (UI) that enables a user to monitor a data center, as described herein. Examples of UI's include, without limitation, a graphical user interface (GUI) and web-based user interface. The electronic display 235 may be part of an electronic device of a user, such as mobile (or portable) electronic device. In some examples, one or more updates with respect to an attribute and/or a state of each or a subset of at least 1, 2, 3, 4, 5, 6, 7, 8, 9, 10, 20, 30, 40, 50, 60, 70, 80, 90, 100, 200, 300, 400, 500, or 1000 computer servers can be displayed on the electronic display 235.

Systems of the present disclosure can enable the monitoring of remote data centers having various numbers of computer servers. For example, a system of the present disclosure can enable a remote data center having at least 1, 2, 3, 4, 5, 6, 7, 8, 9, 10, 20, 30, 40, 50, 60, 70, 80, 90, 100, 200, 300, 400, 500, or 1000 computer servers to be monitored. A subset of the computer servers can be different from a remainder of the computer servers.

Methods and systems of the present disclosure may be combined with or modified by other methods and systems, such as those described in, for example, PCT/US15/44721 ("SYSTEMS FOR MANAGING DATACENTERS"), which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A method for managing a datacenter that comprises a plurality of servers operable to store data on computer readable media, the method comprising:

configuring a plurality of computers as a management system for the datacenter, wherein a first computer of the plurality of computers is configured to operate as a dedicated computer of the management system to communicate with the datacenter, wherein two or more computers of the plurality of computers are operative to store data associated with the datacenter and only the first computer is configured to be initially contacted by the datacenter for accessing at least a portion of the data when the datacenter wishes to access data;

receiving at the first computer a dedicated request from the datacenter to retrieve a subset of the data;

responsive to receiving the dedicated request from the datacenter, directing a query from the first computer to one or more other computers of the plurality of computers to retrieve respective portions of the subset of the data stored thereat;

aggregating the respective portions of the subset of the data retrieved from the one or more other computers; and transmitting by the first computer the aggregated subset of the data to the datacenter.

2. The method as recited in claim 1, further comprising:
configuring a second computer of the plurality of computers to mirror the first computer; and
responsive to determining that the first computer initially dedicated to the datacenter has experienced a failure, operating the second computer as a dedicated computer with respect to the datacenter.

3. The method as recited in claim 1, wherein the data comprises at least one of data relating to one or more attributes of the datacenter, data relating to one or more qualitative metrics of the datacenter, data relating to one or more operational states of the datacenter, and at least one of financial data, health data, media data, and textual data of one or more users.

4. The method as recited in claim 1, further comprising configuring the plurality of computers as a virtual datacenter.

5. The method as recited in claim 1, wherein the plurality of computers are configured to communicate with one another over an internal network and the first computer is configured to receive the dedicated request from the datacenter over an external network.

6. The method as recited in claim 1, wherein the data is stored in a distributed fashion on at least a subset of the plurality of computers.

7. The method as recited in claim 6, wherein the data is stored with a timestamp that corresponds to a date and one or more time points at which the data is stored in respective computers of the subset of the plurality of computers.

8. The method as recited in claim 7, wherein the aggregating of the respective portions of the subset of the data comprises sorting the retrieved data by the timestamp.

9. A system for managing a datacenter that comprises a plurality of servers operable to store data on computer readable media, the system comprising:
a plurality of computers coupled to one another over a first network, wherein the plurality of computers are configured as a management system for the datacenter, the management system including a first computer of the plurality of computers configured to operate as a dedicated computer to communicate with the datacenter and wherein two or more computers of the plurality of computers are operative to store data associated with the datacenter and only the first computer is configured to be initially contacted by the datacenter for accessing at least a portion of the data when the datacenter wishes to access data;
a communication interface of the first computer configured to facilitate communications between the first computer and the datacenter over a second network, the second network operating as an external network relative to the plurality of computers; and
a set of program instructions executing on the first computer for performing following actions:
receiving at the first computer a dedicated request from the datacenter to retrieve a subset of the data over the second network;
responsive to receiving the dedicated request from the datacenter, directing a query from the first computer to one or more other computers of the plurality of computers to retrieve respective portions of the subset of the data stored thereat;
aggregating the respective portions of the subset of the data retrieved from the one or more other computers; and
transmitting by the first computer the aggregated subset of the data to the datacenter.

10. The system as recited in claim 9, wherein a second computer of the plurality of computers configured to mirror the first computer such that the second computer is operative as a dedicated computer with respect to the datacenter responsive to determining that the first computer initially dedicated to the datacenter has experienced a failure.

11. The system as recited in claim 9, wherein the data comprises at least one of data relating to one or more attributes of the datacenter, data relating to one or more qualitative metrics of the datacenter, data relating to one or more operational states of the datacenter, and at least one of financial data, health data, media data, and textual data of one or more users.

12. The system as recited in claim 9, wherein the plurality of computers are further configured to operate as a virtual datacenter.

13. The system as recited in claim 9, wherein the data is stored in a distributed fashion on at least a subset of the plurality of computers.

14. The system as recited in claim 13, wherein the data is stored with a timestamp that corresponds to a date and one or more time points at which the data is stored in respective computers of the subset of the plurality of computers.

15. The system as recited in claim 14, wherein the program instructions for aggregating the respective portions of the subset of the data comprise program instructions for sorting the retrieved data by the timestamp.

16. The system as recited in claim 9, wherein no other computer of the plurality of computers is configured to communicate with the datacenter.

17. A non-transitory computer storage medium comprising machine-executable code that implements, upon execution by one or more processors, a method of managing a datacenter that comprises a plurality of servers operable to store data on computer readable media, the method comprising:
configuring a plurality of computers as a management system for the datacenter, wherein a first computer of the plurality of computers is configured to operate as a dedicated computer of the management system to communicate with the datacenter, wherein two or more computers of the plurality of computers are operative to store data associated with the datacenter and only the first computer is configured to be initially contacted by the datacenter for accessing at least a portion of the data when the datacenter wishes to access data;
receiving at the first computer a dedicated request from the datacenter to retrieve a subset of the data;
responsive to receiving the dedicated request from the datacenter, directing a query from the first computer to one or more other computers of the plurality of computers to retrieve respective portions of the subset of the data stored thereat;
aggregating the respective portions of the subset of the data retrieved from the one or more other computers; and
transmitting by the first computer the aggregated subset of the data to the datacenter.

18. The non-transitory computer storage medium as recited in claim 17, wherein the machine-executable code comprises program instructions for performing:

configuring a second computer of the plurality of computers to mirror the first computer; and responsive to determining that the first computer initially dedicated to the datacenter has experienced a failure, operating the second computer as a dedicated computer with respect to the datacenter.

19. The non-transitory computer storage medium as recited in claim 17, wherein the data comprises at least one of data relating to one or more attributes of the datacenter, data relating to one or more qualitative metrics of the datacenter, data relating to one or more operational states of the datacenter, and at least one of financial data, health data, media data, and textual data of one or more users.

20. The non-transitory computer storage medium as recited in claim 17, wherein the machine-executable code further comprises program instructions for configuring the plurality of computers as a virtual datacenter.

* * * * *